United States Patent
Komine et al.

(10) Patent No.: US 10,521,774 B2
(45) Date of Patent: Dec. 31, 2019

(54) PREVENTIVE MAINTENANCE SYSTEM AND PREVENTIVE MAINTENANCE METHOD

(71) Applicant: ASM IP Holding B.V., Almere (NL)

(72) Inventors: Hanako Komine, Tokyo (JP); Phuc Hong Ninh, Kawasaki (JP)

(73) Assignee: ASM IP Holding B.V., Almere (NL)

( * ) Notice: Subject to any disclaimer, the term of this patent is extended or adjusted under 35 U.S.C. 154(b) by 315 days.

(21) Appl. No.: 15/077,181

(22) Filed: Mar. 22, 2016

(65) Prior Publication Data

US 2017/0278074 A1 Sep. 28, 2017

(51) Int. Cl.
 *G06Q 10/00* (2012.01)

(52) U.S. Cl.
 CPC ............ *G06Q 10/20* (2013.01); *Y02P 90/083* (2015.11); *Y02P 90/14* (2015.11); *Y02P 90/28* (2015.11); *Y02P 90/86* (2015.11)

(58) Field of Classification Search
 CPC ....... G06Q 10/20; B25J 9/1692; G01B 11/03; G01B 21/042; H01L 21/67742; H01L 21/67748; H01L 21/681; H01L 21/67167; H01L 21/67196; H01L 21/67242; H01L 21/67248; H01L 21/67253; H01L 21/67259; H01L 21/672; G03F 7/707; G03F 7/70708; G03F 7/7085; G05B 2219/37278; G05B 2219/37608; G05B 2219/39047; G05B 2219/39056; Y10S 414/135; Y10T 29/49769; Y10T 29/49004
 USPC ...... 700/254; 348/95; 414/222.02, 816, 936, 414/754, 939, 941
 See application file for complete search history.

(56) References Cited

U.S. PATENT DOCUMENTS

| 6,244,121 | B1 | 6/2001 | Hunter |
| 6,468,816 | B2 | 10/2002 | Hunter |
| 6,734,027 | B2 | 5/2004 | Jonkers |
| 6,895,831 | B2 | 5/2005 | Hunter |
| 6,934,606 | B1* | 8/2005 | Genetti ............ H01L 21/67201 118/712 |
| 7,434,485 | B2 | 10/2008 | Hunter |
| 2005/0060103 | A1* | 3/2005 | Chamness ............ G05B 23/024 702/30 |
| 2012/0072005 | A1* | 3/2012 | Doki ................ H01L 21/67259 700/114 |
| 2017/0053819 | A1* | 2/2017 | Richardson ....... H01L 21/67259 |
| 2017/0213750 | A1* | 7/2017 | Khaja .................... B65G 43/00 |

FOREIGN PATENT DOCUMENTS

| JP | 2003-140703 A | 5/2003 |
| JP | 2014-159080 A | 9/2014 |
| JP | 2014-184525 A | 10/2014 |

* cited by examiner

*Primary Examiner* — Mouloucoulaye Inoussa
(74) *Attorney, Agent, or Firm* — Studebaker & Brackett PC

(57) ABSTRACT

A preventive maintenance system includes a sensor attached to a movable part, and a preventive maintenance device which accumulates data on the operation of the movable part detected with the sensor, detects an indication of a malfunction of the movable part from a correlation between the operation data and a malfunction mode of the movable part, and notifies an operator of an indication of the malfunction when the indication of the malfunction of the movable part is found, or orders a replacement part for a component part which is a cause of the indication of the malfunction.

12 Claims, 7 Drawing Sheets

PREVENTIVE MAINTENANCE SYSTEM AND PREVENTIVE MAINTENANCE METHOD

BACKGROUND OF THE INVENTION

Field of the Invention

The present invention relates to a preventive maintenance system which detects an indication of a malfunction of a movable part and a preventive maintenance method using the preventive maintenance system.

Background Art

JP 2014-184525 A discloses a motor-driven robot arm.

For example, a semiconductor manufacturing apparatus uses a robot arm to transport substrates. When the robot arm malfunctions, an object to be transported is damaged and the productivity is reduced. It is, therefore, preferable to detect an indication of a malfunction of the robot arm and to repair the robot arm before the robot arm malfunctions actually. It is also preferable to detect an indication of a malfunction of some movable part other than the robot arm and to repair the movable part before the malfunction.

SUMMARY OF THE INVENTION

In order to solve the above-described problem, an object of the present invention is to provide a preventive maintenance system and method capable of detecting an indication of a malfunction of a movable part.

The features and advantages of the present invention may be summarized as follows.

According to one aspect of the present invention, a preventive maintenance system includes a sensor attached to a movable part, and a preventive maintenance device which accumulates data on the operation of the movable part detected with the sensor, detects an indication of a malfunction of the movable part from a correlation between the operation data and a malfunction mode of the movable part, and notifies an operator of an indication of the malfunction when the indication of the malfunction of the movable part is found, or orders a replacement part for a component part which is a cause of the indication of the malfunction.

According to another aspect of the present invention, a preventive maintenance method includes the steps of accumulating data on the operation of a movable part detected with a sensor attached to the movable part and finding a correlation between the operation data and a malfunction mode of the movable part, monitoring the operation data and detecting an indication of a malfunction of the movable part from the correlation, and notifying an operator of an indication of the malfunction when the indication of the malfunction of the movable part is found, or ordering a replacement part for a component part which is a cause of the indication of the malfunction.

Other and further objects, features and advantages of the invention will appear more fully from the following description.

DETAILED DESCRIPTION OF THE PREFERRED EMBODIMENTS

Figure 1:
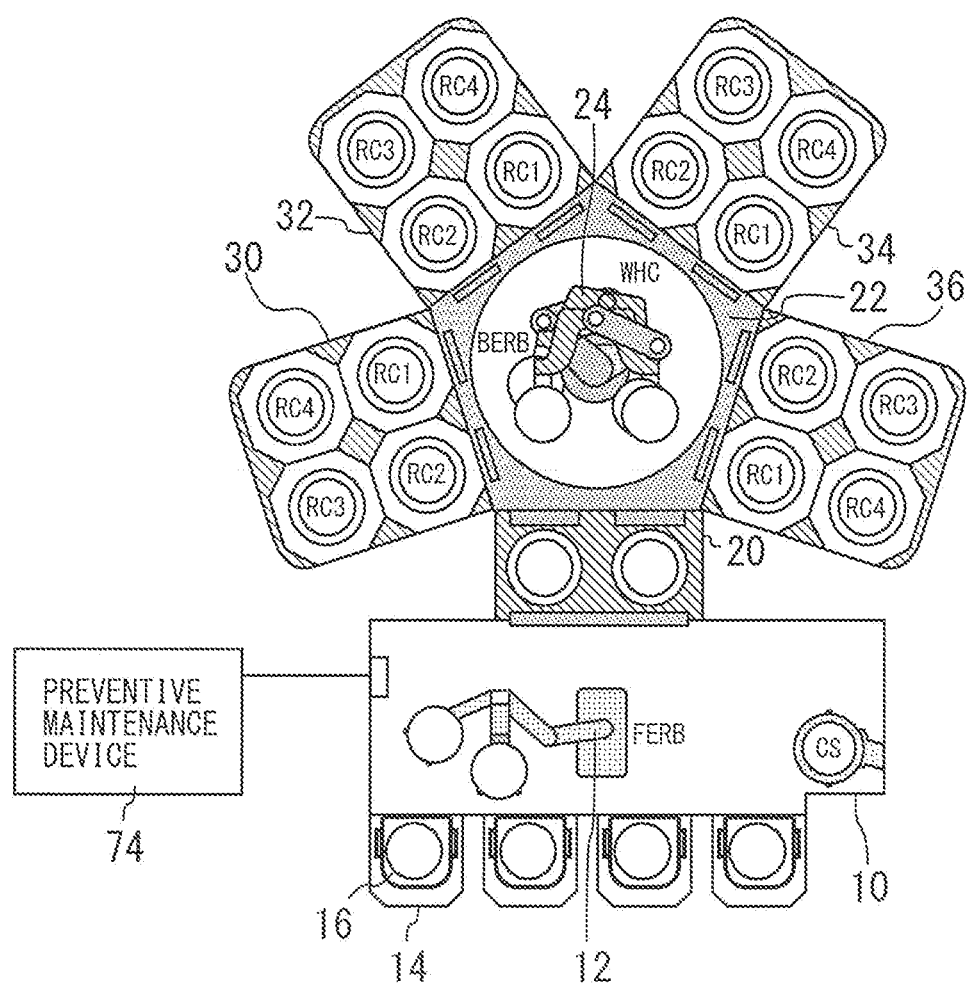
FIG. 1 is a plan view of a substrate processing apparatus including a preventive maintenance system according to a first embodiment.

A preventive maintenance system and a preventive maintenance method according to an embodiment of the present invention will be described with reference to the drawings. Components identical or corresponding to each other are assigned the same reference characters and repeated description of them is avoided in some cases.

First Embodiment

FIG. 1 is a plan view of a substrate processing apparatus including a preventive maintenance system according to a first embodiment of the present invention. The substrate processing apparatus is provided with a transport chamber 10. The interior of the transport chamber 10 is maintained generally at atmospheric pressure. The transport chamber 10 is called an equipment front end module (EFEM). A robot arm 12 is provided in the transport chamber 10. The robot arm 12 has, for example, an upper arm and a lower arm and is capable of separately transporting two substrates by means of the upper and lower arms.

A load port 14 is attached on a side surface of the transport chamber 10. The load port 14 is a table on which a case 16 containing substrates is placed. The robot arm 12 draws out a substrate from the case 16 or puts a substrate in the case 16. A load lock chamber 20 is attached on another side surface of the transport chamber 10. A vacuum chamber 22 is attached to the load lock chamber 20. The vacuum chamber 22 is called a wafer handling chamber (WHC). A robot arm 24 is provided in the vacuum chamber 22.

Quad chamber modules (QCMs) 30, 32, 34, and 36 are connected to four side surfaces of the vacuum chamber 22. Each QCM is a module having four reactor chambers (RC1 to RC4). Processing such as plasma film forming processing is performed on a substrate in each reactor chamber.

With the robot arm 24, substrates are supplied into the RC1 and RC2 or substrates are drawn out from the RC1 and RC2. A substrate transport arm called a rotation arm is provided in the QCM 30. With the rotation arm, a substrate can be moved to any one of the RCs in the QCM 30. Each of the QCMs 32, 34, and 36 is of the same construction as the QCM 30.

A preventive maintenance device 74 is connected to the transport chamber 10. The preventive maintenance device 74 is a device capable of recognizing an indication of a malfunction of the robot arm 12.

Figure 2:
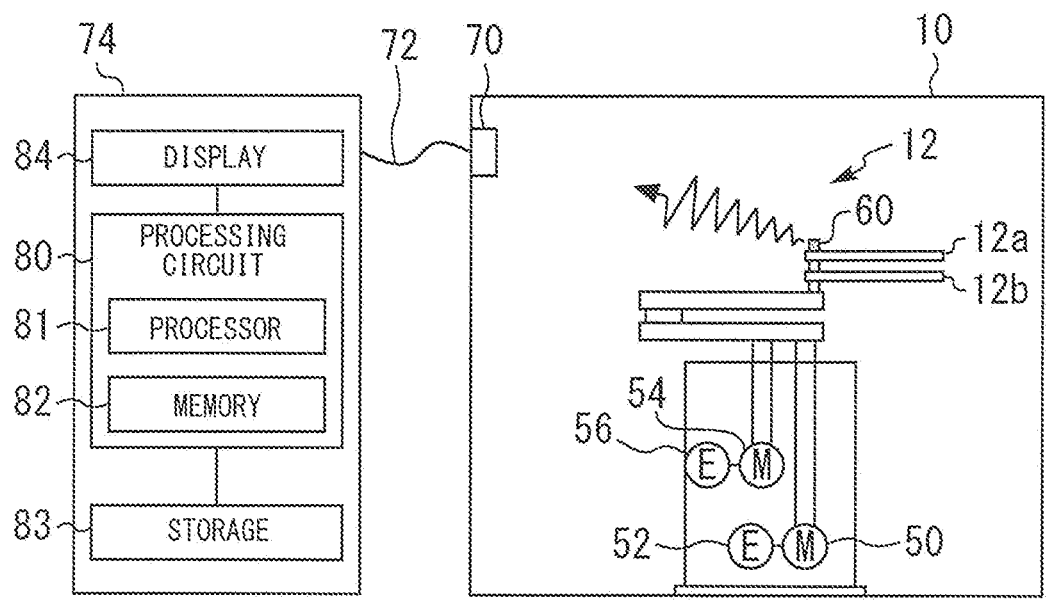
FIG. 2 is a diagram showing internal portions of the transport chamber and the preventive maintenance device.

FIG. 2 is a diagram showing internal portions of the transport chamber 10 and the preventive maintenance device 74. The robot arm 12 is provided in the transport chamber 10. The robot arm 12 has an arm 12a with which a substrate is transported and an arm 12b with which another substrate is transported. The arms 12a and 12b are driven by a motor 50 connected to an encoder 52 and a motor 54 connected to an encoder 56. Each of the arms 12a and 12b functions as an end effector. The positions of the arms 12a and 12b are controlled by using, for example, an angular sensor and a robot controller. Any of well-known control methods can be adopted for position control of the arms 12a and 12b. For example, a position control method described in JP 2014-184525 A can be adopted.

Figure 3:
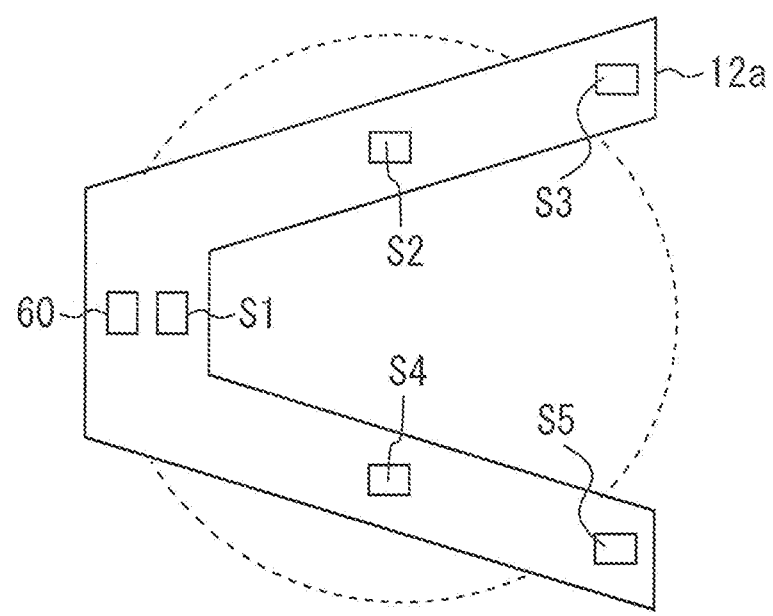
FIG. 3 is a plan view of the arm.

FIG. 3 is a plan view of the arm 12a. A gyro sensor S1 and a signal transmitting unit 60 are attached to a proximal end portion of the arm 12a. Temperature sensors S2 and S4 are attached at intermediate positions on the arm 12a. Acceleration sensors S3 and S5 are attached at distal end positions on the arm 12a. Operation data obtained by the sensors is transmitted to the signal transmitting unit 60. Either wired or wireless transmitting means may be used for this transmission. A broken line indicates an attracted position of a substrate. The same sensors as those on the arm 12a are attached to the arm 12b.

Figure 4:
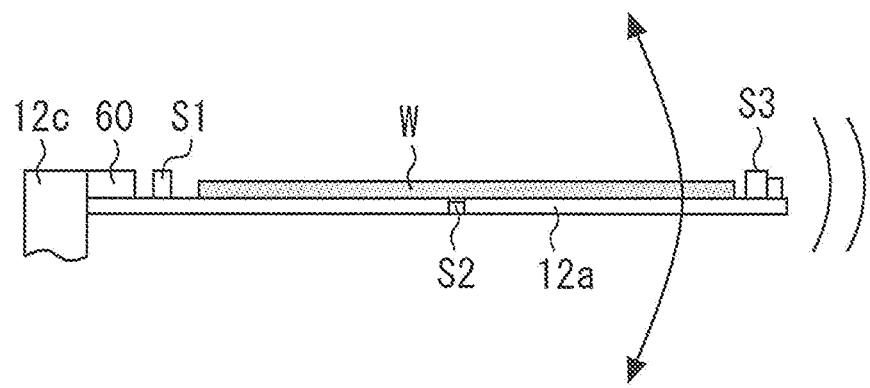
FIG. 4 is a front view of the arm.

FIG. 4 is a side view of the arm 12a on which a substrate is placed. A substrate W is placed on the arm 12a. The substrate W is, for example, a silicon wafer. The arm 12a is turned on a shaft 12c. Since the gyro sensor S1 is near the shaft 12c, the angular velocity of the arm 12a, for example, can be detected with the gyro sensor S1. Since the temperature sensors S2 and S4 are located below the substrate W, the temperature of the substrate W can be detected with the temperature sensors S2 and S4. The temperature sensors S2 and S4 are a non-contact temperature sensor. Since the arm 12a is turnable on the shaft 12c, the acceleration of the arm 12a can be detected with the acceleration sensors S3 and S5 provided at the distal end positions on the arm 12a. With the acceleration sensors S3 and S5, mainly shakes of the distal ends of the arm 12a are detected when the substrate is processed. Preferably, micro-electro-mechanical-systems (MEMS) devices are provided as all the sensors so that the price, size and power consumption of the sensors are reduced.

Referring back to FIG. 2, a signal receiving unit 70 connected to the preventive maintenance device 74 by wiring 72 is provided in the transport chamber 10. The signal transmitting unit 60 wirelessly transmits to the signal receiving unit 70 data on the operations of the arms 12a and 12b detected with the sensors. The preventive maintenance device 74 receives the operation data from the signal receiving unit 70. The preventive maintenance device 74 has a processing circuit 80, a storage 83 and a display 84.

The processing circuit 80 includes a processor 81 and a memory 82. In the processing circuit 80, a program stored in the memory 82 is executed by the processor 81. The processor 81 is a central processing unit (CPU), e.g., a central processing device, a processing device, a microprocessor, a microcomputer, a processor or a digital signal processor (DSP).

The storage 83 is a unit in which operation data detected with the above-described sensors is stored. The display 84 is a unit which displays an output from the processing circuit 80. The sensors attached to the arms 12a and 12b, the signal transmitting unit 60, the signal receiving unit 70 and the preventive maintenance device 74 constitutes a preventive maintenance system. A preventive maintenance method using this preventive maintenance system will subsequently be described.

First, arm operation data detected with the sensors is wirelessly transmitted from the signal transmitting unit 60 to the signal receiving unit 70 and accumulated in the storage 83. Next, the accumulated operation data and a track record of malfunctions of the robot arm 12 are collated with each other to find a correlation between the operation data and a malfunction mode of the robot arm 12. For example, a correlation thereby found is such that a malfunction of the motor 50 or 54 is expected when the angular velocity of the arm in the operation data deviates from a normal value. For example, another possible correlation is such that a breakage of the arm 12a or 12b is expected when the acceleration in the operation data deviates from a normal value.

It is, therefore, important to obtain as much information as possible as operation data. It is preferable to obtain, for example, operation data including a change in value with malfunctioning of the drive system including the motors, operation data including a change in value when the set position of the arm deviates from a predetermined position, and operation data including a change in value when a scratch and particles are generated as a result of an inclination of the substrate relative to the arm.

After correlations are established between the operation data and the malfunction modes of the robot arm as described above, operation data newly obtained is monitored to detect an indication of a malfunction of the robot arm 12 from the above-described correlations. For example, in a case where a motor malfunction is expected from a large deviation of operation data X from a normal value, a slight deviation of operation data X from the normal value presently caused is detected as a "motor malfunction indication". The difference between obtained operation data X1 and normal operation data X2 may be monitored or an approach of obtained operation data X1 to operation data X3 at the time of malfunctioning may be detected. In short, an indication of a malfunction of the robot arm 12 is found from such as a slight deviation of the obtained operation data from the normal operation data. At an initial stage, an engineer's determination as to whether an indication of a malfunction is true or not is required.

As an indication of another malfunction, a longer than usual time taken to complete a transport operation in operation data Y on the time taken to complete the transport operation, which is recognized when the value of obtained operation data Y1 is larger than that of normal operation data Y2, may be mentioned. In such a case, an indication of a malfunction of an arm turning mechanism, for example, is detected. An indication of a malfunction of the robot arm 12 is detected in the processing circuit 80.

When an indication of a malfunction of the robot arm 12 is found in the above-described way, the processing circuit 80 notifies the operator of the indication of the malfunction by displaying the indication on the display 84 or issuing an alarm sound. The preventive maintenance device 74 may automatically order a replacement part for a component part which is the cause of the indication of the malfunction, instead of notifying the operator. At the indication stage precedent to the actual occurrence of the malfunction, the order for the replacement part is made and the part replacement is performed at the subsequent apparatus maintenance time. Thus, damage to the object to be transport due to a malfunction of the robot arm 12 and a reduction in productivity resulting from stoppage of the apparatus can be prevented.

Figure 5:
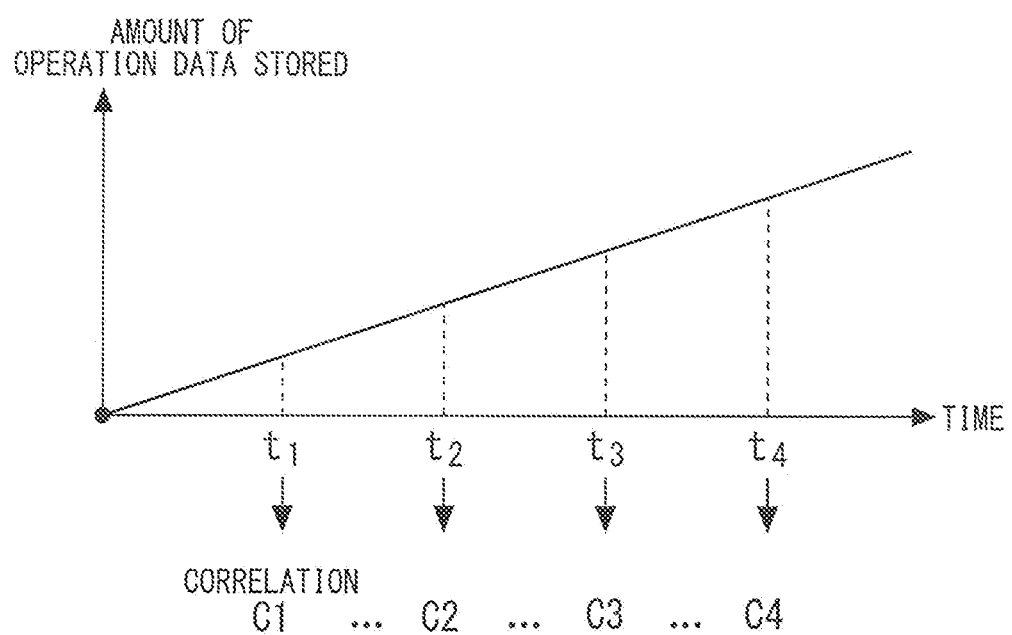
FIG. 5 is a diagram showing the preventive maintenance method.

FIG. 5 is a diagram showing the preventive maintenance method according to the first embodiment of the present invention. At a stage at which a certain amount of operation data is accumulated (time t1), a correlation "C1" between the operation data and a malfunction mode of the robot arm is found. The correlation C1 may be formed by a computer or by an engineer. After the establishment of the correlation C1, monitoring for finding an indication of the malfunction of the robot arm 12 is performed on operation data newly obtained.

Even after the establishment of the correlation C1, accumulation of operation data is continued. A larger amount of operation data can thereby be accumulated in the storage 83. The accuracy of the correlation can be improved by periodically re-establishing the correlation. FIG. 5 shows a process in which the correlation C2 is established at time t2, a correlation C3 is re-established at time t3 and correlation C4 is re-established at time t4. It is preferable that the preventive maintenance device 74 accumulates operation data at all times and periodically updates the correlation, as described above. This process enables the accuracy of the correlation to be successively improved.

Use of the preventive maintenance system according to the first embodiment of the present invention enables detection of an indication of a malfunction of the robot arm 12, as described above. It is preferable to obtain operation data at all times and to sufficiently accumulate data when the robot arm 12 operates normally. The accumulated operation data becomes big data, i.e., a huge complicated data set.

Obtaining operation data all day requires a process of obtaining operation data without hindering the movements of the arms 12*a* and 12*b*. In the first embodiment of the present invention, the movements of the arms 12*a* and 12*b* are not hindered by obtaining operation data, since wireless transmission of operation data from the signal transmitting unit 60 is performed.

The features of the preventive maintenance system according to the first embodiment of the present invention and the preventive maintenance method using the preventive maintenance system reside in accumulating data on the operation of a movable part detected with a sensor, detecting an indication of a malfunction of the movable part from a correlation between the operation data and a malfunction mode of the movable part, and notifying the operator of an indication of the malfunction when the indication of the malfunction of the movable part is found, or ordering a replacement part for a component part which is the cause of the indication of the malfunction. The system and method can be variously modified within such a scope as not to lose their features. For example, preventive maintenance in accordance with the present invention can be applied to various movable parts other than the robot arm 12. The movable part may be any of the rotation arms in the QCMs 30, 32, 34, and 36, any of susceptors in the QCMs 30, 32, 34, and 36, or the robot arm 24 in the vacuum chamber. Needless to say, the present invention functions effectively on movable parts other than those in the film forming apparatus.

It is preferable for the sensor to have at least one of a gyro sensor, a temperature sensor, an acceleration sensor and a strain gage. However, some other kinds of sensors may be used. The positions at which the sensors are set are not particularly specified. However, it is preferable to set each sensor at an optimum position at which effective operation data can be obtained. These modifications can be applied as desired to preventive maintenance systems and preventive maintenance methods according to embodiments described below. Each of the preventive maintenance systems and preventive maintenance methods according to embodiments described below has a number of commonalities with the first embodiment and will therefore be described mainly with respect to points of difference from the first embodiment.

Second Embodiment

Figure 6:
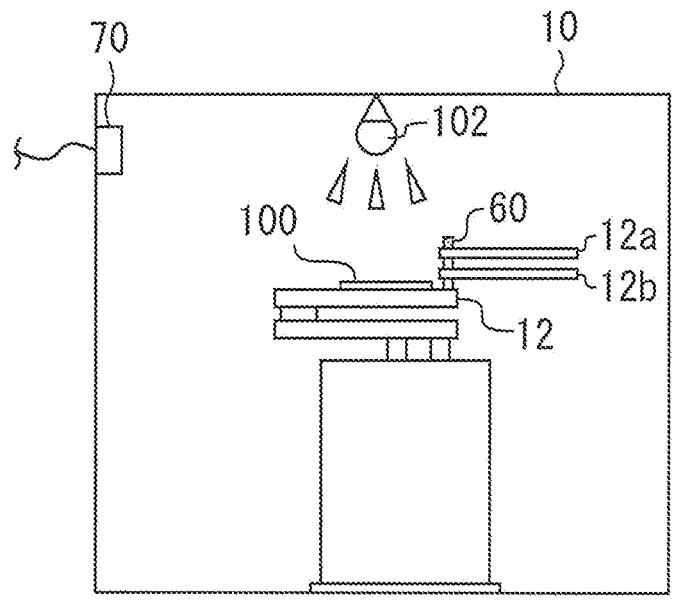
FIG. 6 shows a part of the preventive maintenance system according to the second embodiment.

FIG. 6 shows a part of the preventive maintenance system according to the second embodiment. A solar cell 100 is attached to the robot arm 12. The solar cell 100 may be provided at any position on the robot arm 12. However, it is preferable that the solar cell 100 be provided on a surface other than the substrate attraction surface. An illumination lamp 102 is provided right above the solar cell 100. The solar cell 100 generates power from light from the illumination lamp 102. Power is supplied from the solar cell 100 to the sensors and the signal transmitting unit 60 attached to the arms 12*a* and 12*b*.

In a case where a power supply line from the outside of the robot arm 12 is connected to the sensors and the signal transmitting unit 60, there is a possibility of the power supply line being entangled. This problem can be solved by attaching the solar cell 100 to the robot arm 12 and supplying power from the solar cell 100 to the sensors and the signal transmitting unit 60. The illumination lamp 102 may be provided on a bottom surface of the transport chamber 10. The illumination lamp 102 may be removed and light coming from the clean room into the transport chamber 10 may be utilized.

Third Embodiment

Figure 7:
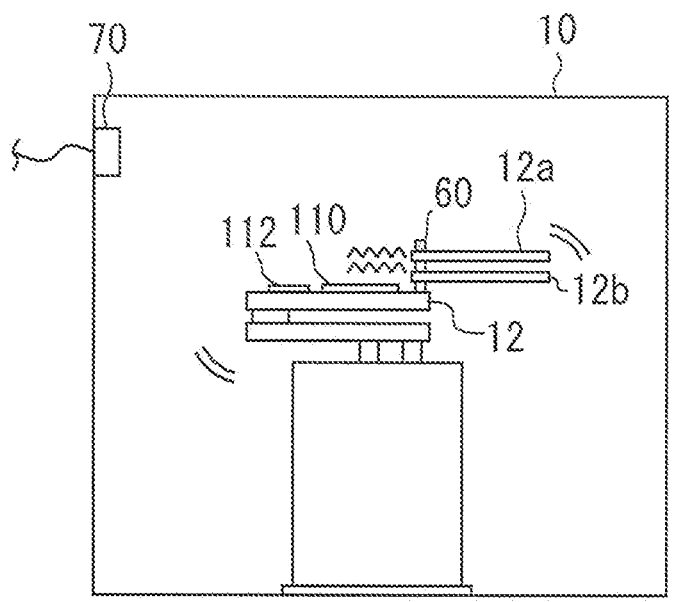
FIG. 7 shows a part of the preventive maintenance system according to the third embodiment.

FIG. 7 shows a part of the preventive maintenance system according to the third embodiment. A vibration battery 110 which generates power from vibration of the robot arm 12 and a storage battery 112 which stores power generated by the vibration battery 110 are provided as a power supply unit for supplying power to the sensors and signal transmitting unit 60. The storage battery 112 is connected to the sensors and the signal transmitting unit 60. The vibration battery 110 and the storage battery 112 are provided in contact with the robot arm 12, thus enabling power supply to the sensors and the signal transmitting unit 60 while preventing entanglement of wiring.

Fourth Embodiment

Figure 8:
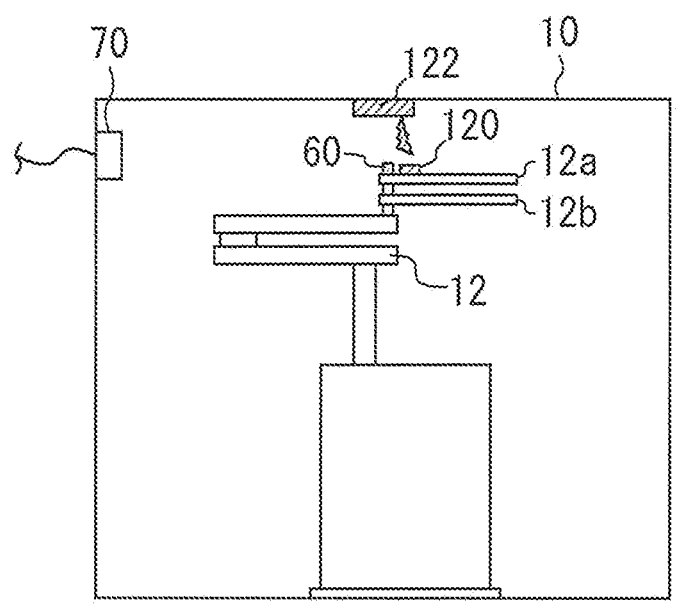
FIG. 8 shows a part of the preventive maintenance system according to the fourth embodiment.

FIG. 8 shows a part of the preventive maintenance system according to the fourth embodiment. A non-contact charger 120 and a home point 122 are provided as a power supply unit for supplying power to the sensors and signal transmitting unit 60. The non-contact charger 120 is attached to the robot arm 12 while the home point 122 is attached to an inner wall of the transport chamber 10. The non-contact charger 120 has a storage battery. The storage battery provided in the non-contact charger 120 is wirelessly charged from the home point 122. The non-contact charger 120 is provided adjacent to the sensor and the signal transmitting unit 60, thus enabling power supply to the sensors and the signal transmitting unit 60 while preventing entanglement of wiring.

In the second to fourth embodiments, the solar cell, the vibration battery and the non-contact charger are adopted as a power supply unit attached to the robot arm 12. However, a device different from these may be provided as a power supply unit as long as the power supply unit wirelessly receive power. For example, a battery capable of supplying power for a time period longer than the maintenance period of the apparatus may be attached to the robot arm 12.

Fifth Embodiment

Figure 9:
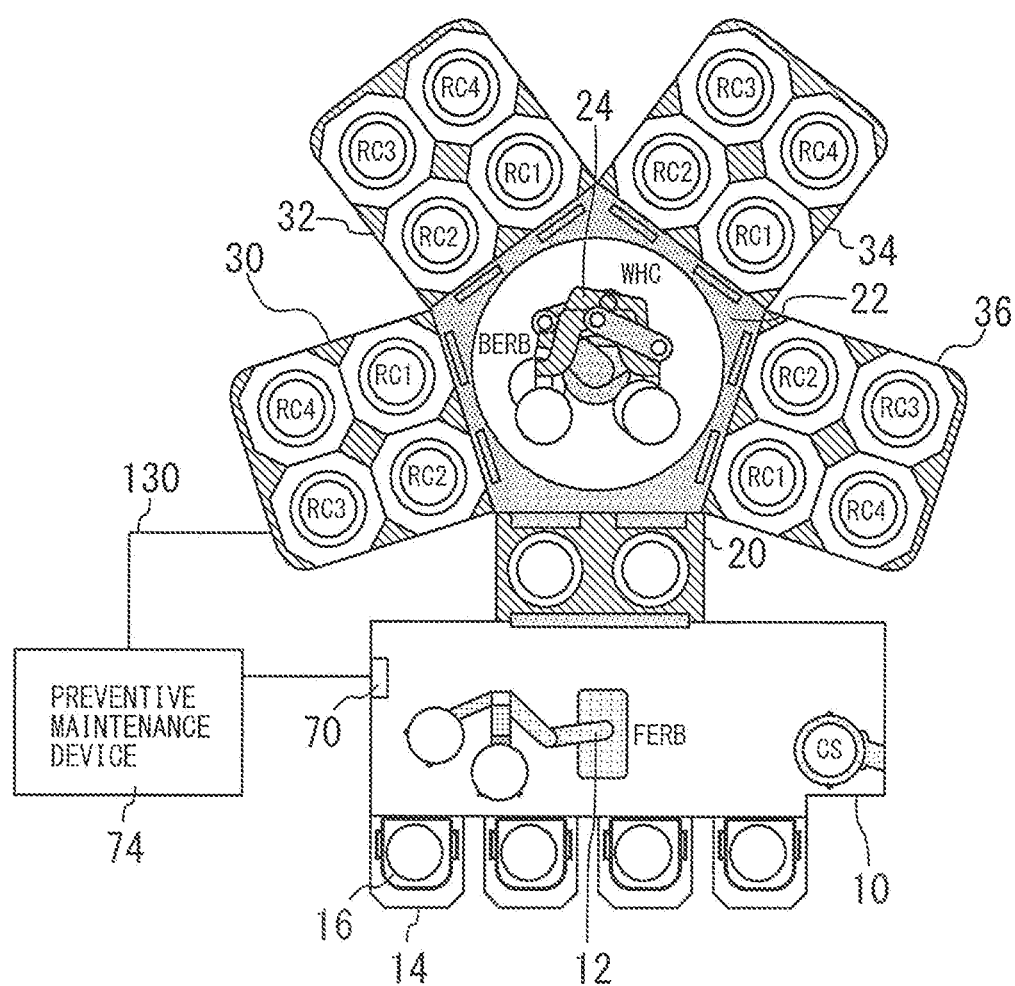
FIG. 9 is a diagram showing a film forming apparatus including the preventive maintenance system according to the fifth embodiment.

FIG. 9 is a diagram showing a film forming apparatus including the preventive maintenance system according to the fifth embodiment. A preventive maintenance device 74 is connected to the QCMs 30, 32, 34, and 36 by wiring 130 and obtains data on film forming from the QCMs 30, 32, 34, and 36. The preventive maintenance device 74 classifies data on the operation of the robot arm 12 so that the operation data when film forming is normally performed is recognized as normal data and the operation data when there is an abnormality in film forming is recognized as abnormal data. For example, film forming in which an atmospheric pressure, a temperature, a film forming time or a plasma density with predetermined ranges is recognized as normal film forming, and film forming in which this condition is not satisfied is recognized as abnormal film forming.

For example, if normal film forming is performed during a time period A, data on the operation of the robot arm 12 obtained during the period A is recognized as normal data. If abnormal film forming is performed during a time period B, data on the operation of the robot arm 12 obtained during the period B is recognized as abnormal data. When abnormal operation data appears, the preventive maintenance device 74 notifies the operator of the appearance of the abnormal data as an "indication of a malfunction of the robot arm 12".

Thus, more comprehensive malfunction indication detection is enabled by associating film forming quality and the "indication of a malfunction of the robot arm 12" with each other. Classification as to whether film forming is normal or abnormal may be performed using information obtained from a device existing outside the film forming apparatus.

Sixth Embodiment

Figure 10:
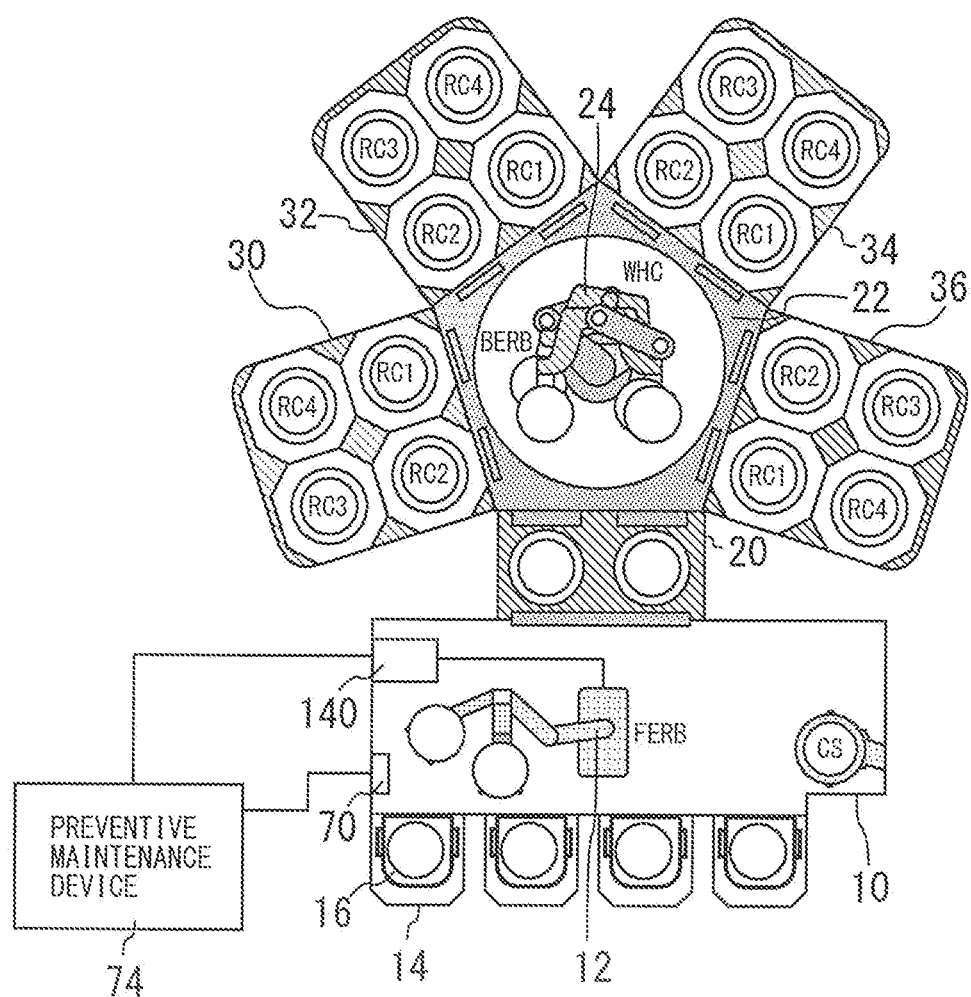
FIG. 10 is a diagram showing a film forming apparatus including the preventive maintenance system according to the sixth embodiment.

FIG. 10 is a diagram showing a film forming apparatus including the preventive maintenance system according to the sixth embodiment. In the preventive maintenance system according to the sixth embodiment, obtained data on the operation of the robot arm 12 is used for "position control on the arms 12*a* and 12*b*" as well as for obtaining the "indication of a malfunction".

Position control on the arms 12*a* and 12*b* is ordinarily estimated through the movements of the motors which drive the arms 12*a* and 12*b*. Position control on the arms 12*a* and 12*b* based on such estimation may lack accuracy. In the sixth embodiment, therefore, a position control unit 140 which performs position control on the arms 12*a* and 12*b* on the basis of operation data is provided. The position control unit 140 obtains data on the operation of the robot arm 12 via the signal receiving unit 70 and controls the positions of the arms 12*a* and 12*b* on the basis of the operation data. The arms 12*a* and 12*b* can thus be controlled with accuracy. A suitable combination of the features of the preventive maintenance systems and the preventive maintenance methods according to the above-described embodiments may be made and used.

According to the present invention, an indication of a malfunction of a movable part can be detected from an unusual operating condition or the like of the movable part.

Obviously many modifications and variations of the present invention are possible in the light of the above teachings. It is therefore to be understood that within the scope of the appended claims the invention may be practiced otherwise than as specifically described.

What is claimed is:

1. A preventive maintenance system comprising:
    a sensor attached to a movable part and configured to sense a physical condition pertaining to the movable part; and
    a preventive maintenance device comprising a processor which accumulates data on the operation of the movable part based on the physical condition pertaining to the movable part detected with the sensor, detects an indication of a malfunction of the movable part precedent to an actual occurrence of the malfunction of the movable part from a correlation between the operation data and a malfunction mode of the movable part, and notifies an operator of the indication of the malfunction of the movable part precedent to the actual occurrence of the malfunction of the movable part, or orders a replacement part for a component part which is a cause of the indication instead of notifying the operator of the indication.

2. The preventive maintenance system according to claim 1, wherein the sensor has at least one of a gyro sensor, a temperature sensor, an acceleration sensor and a strain gage.

3. The preventive maintenance system according to claim 1, wherein the preventive maintenance device accumulates the operation data at all times and periodically updates the correlation.

4. The preventive maintenance system according to claim 1, further comprising:
    a signal transmitting unit attached to the movable part; and
    a signal receiving unit connected to the preventive maintenance device,
    wherein the signal transmitting unit wirelessly transmits to the signal receiving unit the data on the operation of the movable part detected with the sensor.

5. The preventive maintenance system according to claim 4, further comprising a power supply unit attached to the movable part in such a way that the power supply unit wirelessly receive power, the power supply unit supplies power to the sensor and the signal transmitting unit.

6. The preventive maintenance system according to claim 5, wherein the power supply unit is a solar cell.

7. The preventive maintenance system according to claim 5, wherein the power supply unit has a vibration battery which generates power from vibration of the movable part, and a storage battery which stores power generated by the vibration battery.

8. The preventive maintenance system according to claim 5, wherein the power supply unit is a non-contact charger.

9. The preventive maintenance system according to claim 1, wherein the movable part is a robot arm which transports a substrate in a film forming apparatus, and
    the preventive maintenance device recognizes as normal operation data the operation data when film forming is normally performed, recognizes as abnormal operation data the operation data when there is an abnormality in film forming, and notifies the operator of the abnormal operation data when the abnormal operation data appears.

10. The preventive maintenance system according to claim 1, further comprising a position control unit which performs position control on the movable part on the basis of the operation data.

11. A preventive maintenance system comprising:
a sensor attached to a movable part and configured to sense a physical condition pertaining to the movable part; and
a preventive maintenance device comprising a processor which accumulates data on the operation of the movable part based on the physical condition pertaining to the movable part detected with the sensor, detects an indication of a malfunction of the movable part precedent to an actual occurrence of the malfunction of the movable part from a correlation between the operation data and a malfunction mode of the movable part, and orders a replacement part for a component part which is a cause of the indication of the malfunction of the movable part precedent to the actual occurrence of the malfunction when the indication is found instead of notifying an operator of the indication.

12. The preventive maintenance system according to claim 11, wherein the preventive maintenance device accumulates the operation data at all times and periodically updates the correlation.

* * * * *